R. SCHMITT.
Improvement in Locks for Valises, &c.
No. 125,223.  Patented April 2, 1872.
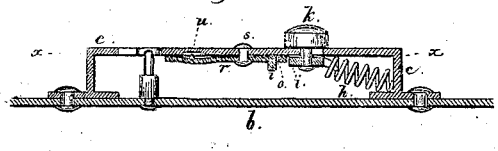
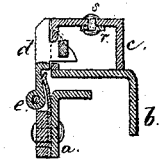
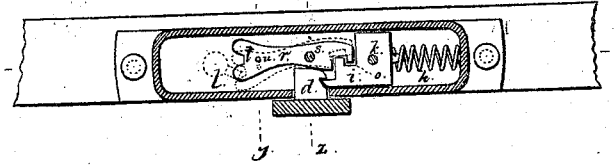

125,223

UNITED STATES PATENT OFFICE.

REINHARD SCHMITT, OF NEWARK, NEW JERSEY.

IMPROVEMENT IN LOCKS FOR VALISES, &c.

Specification forming part of Letters Patent No. 125,223, dated April 2, 1872.

*To all whom it may concern:*

Be it known that I, REINHARD SCHMITT, of Newark, in the county of Essex and State of New Jersey, have invented an Improvement in Locks for Valises, &c.; and the following is declared to be a correct description thereof.

Locks for valises have been made with a spring-catch for holding the parts of the valise together; and in some instances there has been a separate bolt acted upon by a key, to enter the hasp and hold the same. In other instances there have been a tumbler and a bolt with a pin to block the catch and prevent its being moved. These devices are costly, and in many instances they are difficult to apply to a valise.

My invention consists in a spring locking-dog made with a hook at one end and having an inclined tooth taking a notch in the case, in combination with the spring-latch, to hold the said latch when the bag is locked; and this spring locking-dog is a very simple, strong, and easily-applied device, that does not require any separate attachment to the valise, and is not easily displaced, either by design or accidentally, while the valise or bag is in use.

In the drawing, Fig. 1 is a plan of the catch and spring locking-dog at the line $x\ x$ of Fig. 2. Fig. 2 is a vertical section of said spring locking-dog. Fig. 3 is a section at the line $y\ y$; and Fig. 4 is a cross-section at the line $z\ z$.

The parts $a\ b$ forming the frame of the valise or bag are of any desired character. The lock-case $c$ is attached to the frame $b$, and the hasp or catch $d$ is upon the frame $a$. This hasp $d$ may be permanently riveted to the frame $a$, but I prefer that there should be a joint, $e$, and spring to throw the hasp from the lock when unlatched. This hasp can be used in place of a ring in opening the bag. The end of the hasp is made with a notch or mortise to receive the end of the latch $i$ that is within the case $c$, and is projected toward the hasp $d$ by the spring $h$. The knob or button $k$ is employed to draw this latch back; and I remark that said latch is similar to those before employed, except that there is a notch made therein at $o$ for the end of the spring-dog $r$ to catch into and hold the latch in contact with the hasp $d$. The dog $r$ is made as a lever, attached by the rivet $s$, and having talons $t$ for the key $l$ to act against and swing the hook of the dog into or out of the notch $o$. This dog $r$ would be liable to swing or move into or out of the notch $o$, were it not for the projection or tooth $u$ (see Fig. 3) entering one of the notches in the case $c$ at the extremes of its movement; and, in order to allow of the tooth springing out of and into these notches, respectively, as the dog is turned by the key, the body of said dog is made as a spring.

I claim as my invention—

The spring-dog $r$ made with a hook at one end and having an inclined tooth taking the notch in the case, in combination with the latch $i$ and notch $o$, as and for the purposes set forth.

Signed by me this 22d day of January, A. D. 1872.

R. SCHMITT.

Witnesses:
GEO. T. PINCKNEY,
CHAS. H. SMITH.